May 31, 1966    K. STEISSLINGER    3,253,526
CAMERA FILM WINDING ARRANGEMENT
Filed Sept. 6, 1963

KURT STEISSLINGER
INVENTOR.

BY R. Frank Smith
David P. Ogden

ATTORNEYS

United States Patent Office 3,253,526
Patented May 31, 1966

3,253,526
CAMERA FILM WINDING ARRANGEMENT
Kurt Steisslinger, Stuttgart, Germany, assignor to Eastman Kodak Company, Rochester, N.Y.
Filed Sept. 6, 1963, Ser. No. 307,218
6 Claims. (Cl. 95—31)

This invention relates to a camera film winding arrangement and, more particularly, to a construction of a film transport and shutter cocking arrangement in a still camera designed for rapid sequential operation.

Film control means in cameras of this type have become known in numerous embodiments. In some embodiments, the different sizes of the movements necessary for the shutter cocking and the film transport are compensated for by slipping clutches. In other embodiments, gear wheels and lever gearings are used as transmissions. Most of these devices are provided with counting mechanisms which are also associated with film transport and double-exposure interlocks. These known mechanical interlock requirements often result in excessively high costs of manufacture and assembly.

Therefore, it is a primary object of the present invention to provide a simple camera film winding arrangement which, in spite of its reduced number of parts, assures both a foolproof operation and uniformity of the film feed steps.

Another object is to provide a new and improved film position and shutter trigger interlock arrangement.

In accordance with one embodiment of my invention, a photographic camera is provided with a coupled film transport and shutter cocking device including interlock elements. The film transport and shutter cocking are coupled to each other by means of gears and toothed segments, characterized in that after the completion of the shutter cocking, the coupling connection between the two devices is disengaged. The length of the movement necessary for the film transport is determined by a control perforation (one per frame) on or in the light-sensitive film and sensed by a slide finger, which, by way of interlock members, limits the path of transport drive. The drive for the film and shutter cocking are constructed in such a way that even without a film being inserted, the shutter can be cocked and the gear members can return to their initial positions after this cocking.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawing in which:

Figure 1:
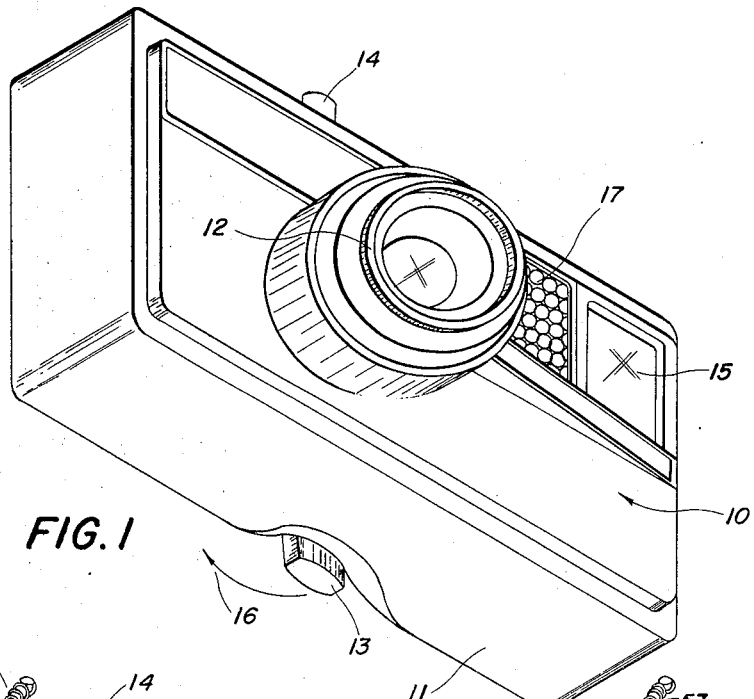
FIG. 1 is a perspective view of a camera adapted to utilize the present invention.

Referring now to the drawing wherein like members refer to similar parts, in FIG. 1, I have shown a camera 10 having a housing 11, a lens system 12 on the front of the housing 11, a film advance lever 13 on the bottom, and a trigger button 14 on the top. The camera 10 is also provided with a viewfinder having a front window, as indicated at 15 and a light meter lens as indicated at 17.

In preparing a fresh frame of film for taking a picture, the film advance lever 13 is moved toward the rear, as indicated by an arrow 16. After the film has been sufficiently advanced, the lever 13 is released to return to standby, and the shutter may be actuated to expose one frame of the film by depression of the trigger button 14. After exposure, the film advance lever 13 is again drivable in the direction of the arrow 16 to place a next portion of unexposed film in the region wherein the lens system 12 will direct an image. As will be explained in greater detail below, the trigger button 14 may not be depressed except after advancement of the film by the film advance lever 13, which simultaneously cocks the shutter. Moreover, an interlock is provided so that once the shutter has been cocked and the film has been properly positioned, the film advance lever 13 cannot be further advanced.

Figure 2:
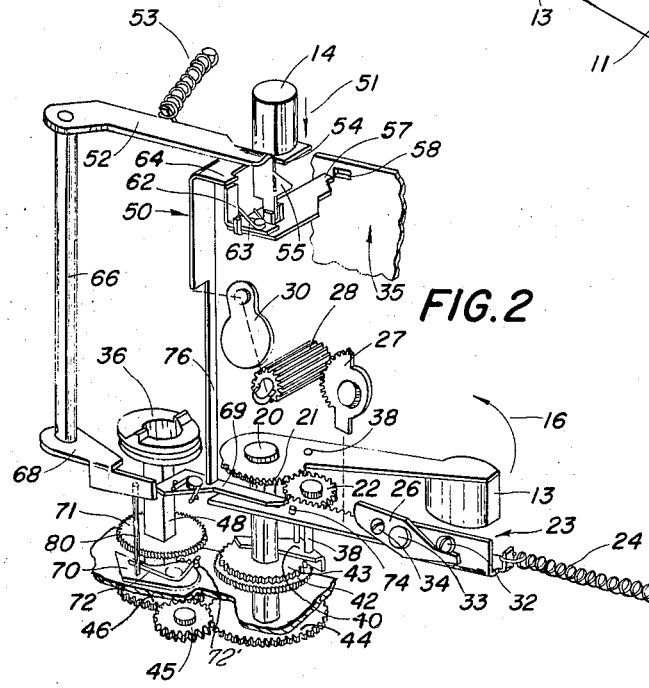
FIG. 2 is an expanded perspective cutaway view of the camera shown in FIG. 1 to illustrate the gearing and interlock linkage during film winding and cocking of the shutter.

Referring now to FIG. 2, I have shown in detail a portion of the gearing necessary for operation of my invention. The film advance lever 13 is pivoted at 20 and has gear teeth 21 arranged to drive an idler gear or pinion 22 which, in turn, drives a rack 23 to the right in the camera 10 (to the left in FIG. 2). A return spring 24 for the rack 23 also provides sufficient spring bias to return the film advance lever 13 to standby position.

On the rack 23 is a lever 26 arranged to drive a toothed segment 27 for rotating a pinion 28 arranged to cock a shutter 30. The lever 26 is adjustable by means of an eccentric bolt 32 about a pivot support 33 to assure accurate cocking of the shutter 30. Once the proper adjustment of the lever 26 has been established, a set screw 34 is locked in place to maintain the proper setting.

The film itself, as indicated at 35, is driven by a film transport coupling member 36 which engages a spool within the film cartridge (not shown). Driving of the film transport coupling member 36 is accomplished by the film advance lever 13 through an off-center shaft 38 having an angled lever or pawl 40 secured to the lower portion thereof to drivingly engage ratchet teeth of a ratchet gear 42. A spring (not shown) assures unidirectional coupling between the angled lever 40 and the ratchet 42. The off-center shaft 38 is also drivingly supported by a ratchet gear 43 which is coupled directly to the film advance lever 13. Thus the journal of the rachet gear 42 is coaxial with the pivot point 20. In other words, in order to obtain a ratchet drive of the ratchet 42, the ratchet is made coaxial with the shaft supporting the advance lever 13 but it is not secured thereto. Moreover, although the expanded view of FIG. 1 shows the off-center shaft 38 as relatively long, it need be only long enough to pivotally support the angled lever 40 and then supportably engage the ratchet gear 43.

In operation, as the film advance lever 13 is rotated in the direction of the arrow 16, the ratchet 42 is driven to drive a gear 44 coupled thereto, an idler gear 45 and a gear 46. The gear 46 is drivingly coupled by a shaft 48 to the film transport coupling member 36 to thereby advance the film 35 each time the film advance lever 13 is rotated. Thus, several of the primary functions of the film advance lever 13 are illustrated.

Figure 3:
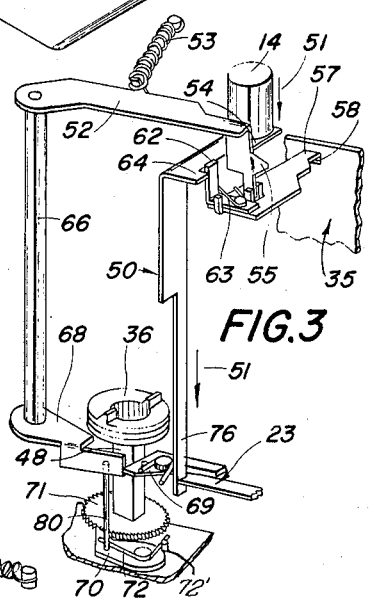
FIG. 3 shows a portion of the gearing of the camera according to FIG. 2 after the completion of the shutter cocking and film transport step with the film advance lever having returned to its initial position.

As is seen more clearly in FIG. 3, triggering of the shutter 30 by the trigger button 14 also drives a trigger assembly 50 downward as indicated by arrows 51 to rotate a lever 52 against the bias of a spring 53. In order to accomplish rotation of the lever 52, the trigger assembly 50 includes a lug 54 which engages a ramp surface 55 of the lever 52. The resulting motion of the lever 52 withdraws a film sensing slide finger 57 from a slot 58 in a portion of the film 35. Once the sensing finger 57 is fully retracted and the trigger assembly 50 is returned to standby by a spring (not shown), a pawl 62 is driven by a spring 63 to reside under (as shown in FIG. 2) a lug 64 of the trigger assembly 50 to prevent repeated depression of the trigger button 14 and thus prevent double exposure.

It is apparent that double exposure is prevented so long as the lever 52 is locked in the retracted position of FIG. 2. In order to accomplish suitable interlocking, the lever 52 is coupled by a shaft 66 to a lever 68 which is secured by a latch 69 (FIG. 2) when the finger 57 is fully retracted. Such latching also unlocks a pawl 70 from a ratchet 71 on the shaft 48 whenever the finger 57 is withdrawn from the slot 58 of the film 35. Thus the pawl 70 may react to a spring 72 and is thereby withdrawn from the ratchet 71 until a driving shaft 80 again engages the lever 68. When the shutter 30 is cocked and the finger 57 resides in a slot 58, the bias of the spring 53 overrides the bias of the spring 72 having a back-up pin 72'.

The film 35 is provided with one slot per frame whereby only one exposure per frame is possible, as will be explained further below. When the sensing finger 57 resides in the slot 58 (FIG. 3), or when there is no film in the camera 10, the pawl 70 tends to lock the ratchet 71 to prevent further driving of the shaft 48 and the film transport coupling member 36, and to thus prevent movement of the film advance lever 13.

As is shown in FIG. 2, the sensing finger 57 is withdrawn and the lever 68 is latched open by the latch 69 to prevent re-entry of the finger 57 into the slot 58. Once the film advance lever 13 has driven the rack 23 to a rightward position, a pin 74 thereon engages a ramp surface of the latch 69 to release the lever 68 and allow the lever 52 to respond to the bias of the spring 53. However, when there is film in the camera, the end of the finger 57 is no longer aligned with a slot 58, as the film transport coupling member 36 has rotated the drive spool to advance the film 35 substantially by the time the pin 74 engages the latch 69. Since the film 35, in the absence of a slot 58, will prevent locking of the ratchet 71 by the pawl 70 further advance of the film transport coupling member 36 is possible.

Additional interlocks are illustrated in FIGS. 2 and 3. For instance, the trigger assembly 50 includes an extension 76 that passes in front of the rack 23 when the trigger button 14 is depressed and when the rack 23 is in the standby position. If the rack 23 is in the rightward position (in the camera terminology, but leftward as shown in the drawing), the trigger assembly 50 cannot be fully depressed to operate the shutter 30 (FIG. 2). Similarly, if the trigger is depressed, the rack 23 may not be driven to the right past the extension 76 (FIG. 3). As is clear from FIGS. 2 and 3, the latch 69 is located near the region through which the extension 76 moves (FIG. 3) when the trigger is depressed. However, the extension 76 is quite close to the pivotal support of the latch 69, whereby the very small clearance provided provides ample freedom of movement to allow the latching operation (68-69). It might be noted from FIG. 2 that the rotational displacement of the latch between the latched and unlatched positions is only a few degrees as illustrated by the small ramp surface engaged by the pin 74.

The initial operation of the camera 10 upon receiving a film cassette having a leader portion as well as the film portion 35 is possible because the slide finger 57 is prevented from being completely seated by the leader paper until a slot 58 is positioned thereunder. Thus, despite the cocking of the camera upon a first operation of the film advance lever 13, pawl 70 is not forced into engagement with the ratchet 71, and advance of the film continues with continued operation of the film advance lever 13. Moreover, since the finger 57 is not fully extended, the pawl 62 still is partially under the lug 64 to prevent operation of the trigger assembly 50. When a first slot 58 is engaged by the slide finger 57, the additional forward motion of the slide finger is transmitted through the linkage above described to the pawl 70, whereupon the further rotation of the film transport coupling member 36 is terminated as is further activation of the film advance lever 13.

In this position, the camera trigger button 14 may be depressed to retract the finger 57 and, as described above, release the pawl 70 until the rack 23 again comes forward sufficiently both to drive the film transport coupling member 36 to thereby move the film 35 and to release the latch 69 to again allow the spring 53 to force the sensing finger 57 against the film 35. At such time as a next slot 58 is sensed, the finger 57 again moves into the slot, and the locking arrangements discussed above prevent further operation of the film advance lever 13.

After a complete sequence of pictures has been taken, such as 12 or 20 frames, utilizing to 12 or 20 slots 58 respectively, the finger 57 rests against the trailing end of the backing paper to allow completion of winding of the roll on the spool driven by the film transport coupling member 36. At such time as the end of the backing paper is reached, the finger 57 is again fully distended to lock the film transport arrangement.

While I have shown and described one embodiment of my invention, slight variations thereof may occur to those skilled in this art. I intend therefore to have all modifications which properly fall within the scope of this invention to be covered by the appended claims.

I claim:

1. A film winding arrangement for a photographic camera only usable with a film having one aperture per frame comprising:

a drive lever having an operator lying without the camera;

a rack member drivable laterally of the camera by said drive lever;

a film transport drive means coupled to said drive lever by gearing;

a sensing slide finger arranged to follow the film during transport and move rearward as an aperture therein is sensed;

interlock means operable in accordance with the position of said sensing finger when in a rearward position to prevent further movement of said gearing;

shutter cocking means operable by said rack during movement less than that necessary to wind a complete frame of film by operation of said transport means;

trigger means operable to release the cocked shutter; and other linkage means coupling said trigger means to said interlock means whereby operation of said trigger means releases said interlock means to allow said drive lever to further advance the film.

2. A film winding arrangement for a photographic camera only usable with a film having one aperture per frame comprising:

a drive lever having an operator lying without the camera;

a rack member drivable laterally of the camera by said drive lever;

a film transport drive means coupled to said drive lever by gearing;

a sensing slide finger arranged to follow film during transport and move rearward as an aperture thereof is sensed;

interlock means operable in accordance with the condition of said sensing finger when in a rearward position to prevent further movement of said gearing;

a shutter cocking lever operable by said rack during movement of said drive lever less than that necessary to wind a complete frame of film by operation of said film transport means wherein said shutter cocking lever is positionable in accordance with an eccentric member on said rack member selectively positionable and securable in such selected position to regulate the effectiveness of the cocking operation; and trigger means operable to release the cocked shutter and to release said interlock means to allow thereby said drive lever to further advance the film.

3. A film winding arrangement suitable for use in a photographic camera provided with a film having one aperture per frame comprising:
- a film transport coupling member;
- a shutter;
- means including a drive lever and gearing for driving said film transport coupling member in a film advancing direction;
- a rack drivable by said drive lever for cocking and shutter;
- film sensing means arranged to sense each aperture in the film and operatively connected to interlock means for preventing movement of said drive lever when an aperture is sensed;
- spring means for biasing said sensing means toward the film;
- trigger means coupled during activator thereof to retract said sensing means from an aperture while operating the shutter;
- latch means for maintaining said sensing means in a retracted position until said film transport coupling member is moved substantially; and
- a pin on said rack for releasing said latch means to allow said film sensing means to respond to said spring means.

4. A film winding arrangement for a photographic camera only usable with a film having one aperture per frame comprising:
- a film advance lever having an operator lying without the camera;
- a rack member drivable laterally of the camera by said film advance lever;
- a film transport drive means coupled to said film advance lever by gearing;
- a sensing slide finger arranged to follow the film during transport and move rearward as an aperture thereof is sensed;
- interlock means operable in accordance with the condition of said sensing finger when in a rearward position to prevent further movement of said gearing;
- trigger means operable to release the cocked shutter and to release said interlock means to allow thereby said drive lever to further advance the film; and
- latch means responsive to the movement of said trigger means for locking said slide finger in a retracted position until said rack is driven laterally a predetermined amount.

5. A film winding arrangement in accordance with claim 4 wherein the gearing coupling said film advance lever to said film transport drive means includes a unidirectional clutch member drivable by an off-center shaft coupled directly to said film advance lever.

6. A film winding arrangement suitable for use in a photographic camera provided with a film having one aperture per frame comprising:
- a film transport coupling member;
- a shutter;
- a drive lever;
- gear means including a unidirectional clutch for coupling said drive lever to said film transport coupling member;
- a rack drivable by motion of said drive lever for cocking said shutter;
- a pivotable lever coupling said rack to said shutter and being lockable in a preselected position to accomplish cocking by a preselected motion of said drive lever;
- film sensing means arranged to sense each aperture in the film and operatively connected to interlock means for preventing movement of said drive lever when an aperture is sensed;
- spring means for biasing said film sensing means toward the film;
- trigger means coupled during activation thereof to retract said film sensing means from an aperture while operating said shutter;
- latch means for maintaining said film sensing means in a retracted position until said film transport coupling member is moved substantially; and
- a pin on said rack for releasing said latch means to allow said film sensing means to respond to said spring means.

References Cited by the Examiner
UNITED STATES PATENTS

| | | | |
|---|---|---|---|
| 1,682,812 | 9/1928 | Thompson | 95—31 |
| 2,275,791 | 3/1942 | Mihalyi | 93—31 |

EVON C. BLUNK, *Primary Examiner.*